April 27, 1954  R. ALKAN  2,676,408
POSITION INDICATING INSTRUMENT, ESPECIALLY FOR AIRCRAFT
Filed Aug. 16, 1951

Robert Alkan
Inventor

By Wilkinson & Mawhinney
Attys.

Robert Alkan
Inventor

Patented Apr. 27, 1954

2,676,408

UNITED STATES PATENT OFFICE 2,676,408

POSITION INDICATING INSTRUMENT, ESPECIALLY FOR AIRCRAFT

Robert Alkan, Paris, France, assignor to Société Française d'Équipements pour la Navigation Aérienne S. F. E. N. A., Seine, France, a joint-stock company of France Application August 16, 1951, Serial No. 242,135

12 Claims. (Cl. 33—1)

This invention relates to position indicating instruments of the type used, especially in aircraft, for providing at all times for the pilot or navigator a visual indication both of the position and the orientation of the craft relative to the starting point and/or to geographical reference points, as well as the course to be followed in order to reach a desired one of such reference points (which may include the craft's point of destination, or an emergency landing field, or the craft's starting point).

An essential object of the invention is to facilitate the construction of such instruments as well as their application to aircraft, and more particularly to aircraft of the fighter class in which the usual desiderata as to low weight and size of the navigational equipment, and convenience in reading and adjustment thereof, are even more exacting than in aircraft of other types.

An improved position indicating instrument according to the invention may comprise one or more of the following features and arrangements:

An index for indicating both the position and orientation of the craft, supported on an arm universally pivoted at a point so that the index will describe a part-spherical surface having the said pivotal point as a centre; a part-spherical transparent dial concentrical with said pivot point and having geographical reference markings thereon; said transparent dial being mounted in the manner of a glass cover or dial within an instrument frame of the instrument planel of the craft, with the index-operating and adjusting mechanism arranged rearwardly of said panel; means for displacing said index over the surface of said part-spherical dial, said means including an angularly-adjustable drive roller adapted to displace a part-spherical member rigid with said index-carrying universally pivoted arm and supported on the end of said arm opposite from the end supporting said index with respect to said pivot point, the said part-spherical member being mounted for two-degree-of-freedom movement about said central point or pivot without being able to revolve about the axis of symmetry of said arm; means for rendering the displacements of said index proportional to the distance covered by the aircraft relatively to the surrounding air, by rotating said drive roller under the control of the receiver mechanism of an air-log or similar device having a transmitter rotated at a rate responsive to the relative air speed of the craft; means for controlling the movement of the air-log receiver device serving to rotate the drive roller, said means comprising a fixed annular electro-magnet adapted to exert an axial attracting force upon a radial, rotatable armature adapted to actuate a pawl (regardless of the angular position of said armature about the axis of the electro-magnet, said angular position in turn being correlated with the angular position of the plane of the drive roller); means for selectively varying the scale of the indications given by the instrument by adjustment of the transmission ratio of the air-log transmitter system; a centralizing or zeroizing means for said index adapted to restore the index to the centre of the dial upon the drive roller being disconnected from the part-spherical member, the centre of said dial representing, for example, the point of departure of the craft; said centralizing means comprising a fixed annular electromagnet adapted to attract, on one side thereof, an armature controlling the disengagement between said roller and part-spherical member and said magnet being provided, on the other side thereof, with an annular flared pole-member applying its attracting force to the edge-surface of a disc surrounding the pivot of said index-carrying arm and rigid with said arm; means for continuously orienting the plane of the drive roller in accordance with the actual heading of the craft with respect to a directional reference, said means comprising a synchronous repeater or receiver connected for operation by a synchronous transmitter controlled by a directional reference instrument or heading-indicator of the aircraft; means for transmitting the angular position of the roller to the index, said means comprising a magnetic connection utilizing on the one hand a directional field on the roller structure, said field being produced by a permanent magnet so arranged that its magnetic axis continually follows up the plane of the roller and, on the other hand, a magnetic system rigid with said index and placed in the field of the directional magnet, said system being connected to said index by a shaft rotatable about the longitudinal axis of the universally pivoted arm; said directional magnetic system being provided in the form of an annulus made of an alloy having a high coercive force, said annulus having comparatively very small radial and longitudinal dimensions; the magnetization in said annulus being so distributed as to produce a directional magnetic field in which the lines of flux are substantially uniformly parallel throughout the area swept by the magnetic system rigid with the index; drift or wind-velocity correcting means preferably associated with the instrument, said means comprising a clockwork mechanism adjustable in speed in proportion to the wind-velocity and an auxiliary transparent part-spherical dial carrying geographical reference markings thereon, said auxiliary dial being displaced by said clockwork mechanism radially in a selected direction corresponding to the direction of the wind, the movement of said auxiliary dial being limited to translatory displacements; zeroizing means for said drift-compensating clockwork mechanism adapted to operate simultaneously with the index-centralizing means and automatically effective to wind up said clockwork mechanism.

Further objects of the invention are to improve the accuracy, sensitivity and reliability of indications supplied by instruments of the class described, facilitate the readings therewith and eliminate disturbing action thereof upon neighbouring instruments, especially on magnetic compasses.

In attaining the above objects the invention may comprise one or more of the following features and arrangements:

Centralizing means for restoring the index to the centre of the dial, comprising an iris diaphragm mechanism provided with spring means tending to urge the iris to its closed condition, and cam means for operating the iris towards its open condition, said cam means being manually operable as with a rotatable knob, improved means for disengaging the part-spherical dial from the drive roller, comprising an axially arranged annular slide member supporting the afore-mentioned two-degree-of-freedom (Cardan) pivot for the index-carrier arm, said slide member being spring-urged towards its engaged position and being movable towards its disengaged position by a cam, said cam being manually operable by means of the same rotating knob as that serving to open the iris; means associated with the disengaging and index-centralizing means whereby the iris cannot be closed unless the disengagement has been fully completed; a mechanical connection for transmitting to the index the orientation of the drive roller plane in such a way that the rotational movement thereof is allowed to pass through the Cardan pivot without said rotation being imparted either to said pivot or to the part-spherical member rigid therewith, said mechanical connection mainly comprising a dual train of gears including two coaxial gears, one of which is actuated by a finger operated by a fork connected for angular movement with the roller and the other gear being adapted to drive the index-carrying shaft; an additional pointer supported on the index-carrying shaft and movable over a dial supported by the universally pivoted arm supporting said index-carrier shaft so as to facilitate accurate reading of the angular position of the index; means for operating the pawl controlling the angularly-adjustable drive roller, said means comprising an orientable magnet oscillating in the field created by an annular electro-magnet; said annular electro-magnet comprising a toroidal magnetical body rectangular in cross section and provided with a circular air-gap at the internal face of the toroid, whereby the latter provides a magnetic screen both against air-gap stray flux and against the magnetomotive force of the orientable magnet oscillating in front of said airgap.

The invention will now be described in connection with two exemplary embodiments thereof with reference to the accompanying drawings wherein.

Figure 1:
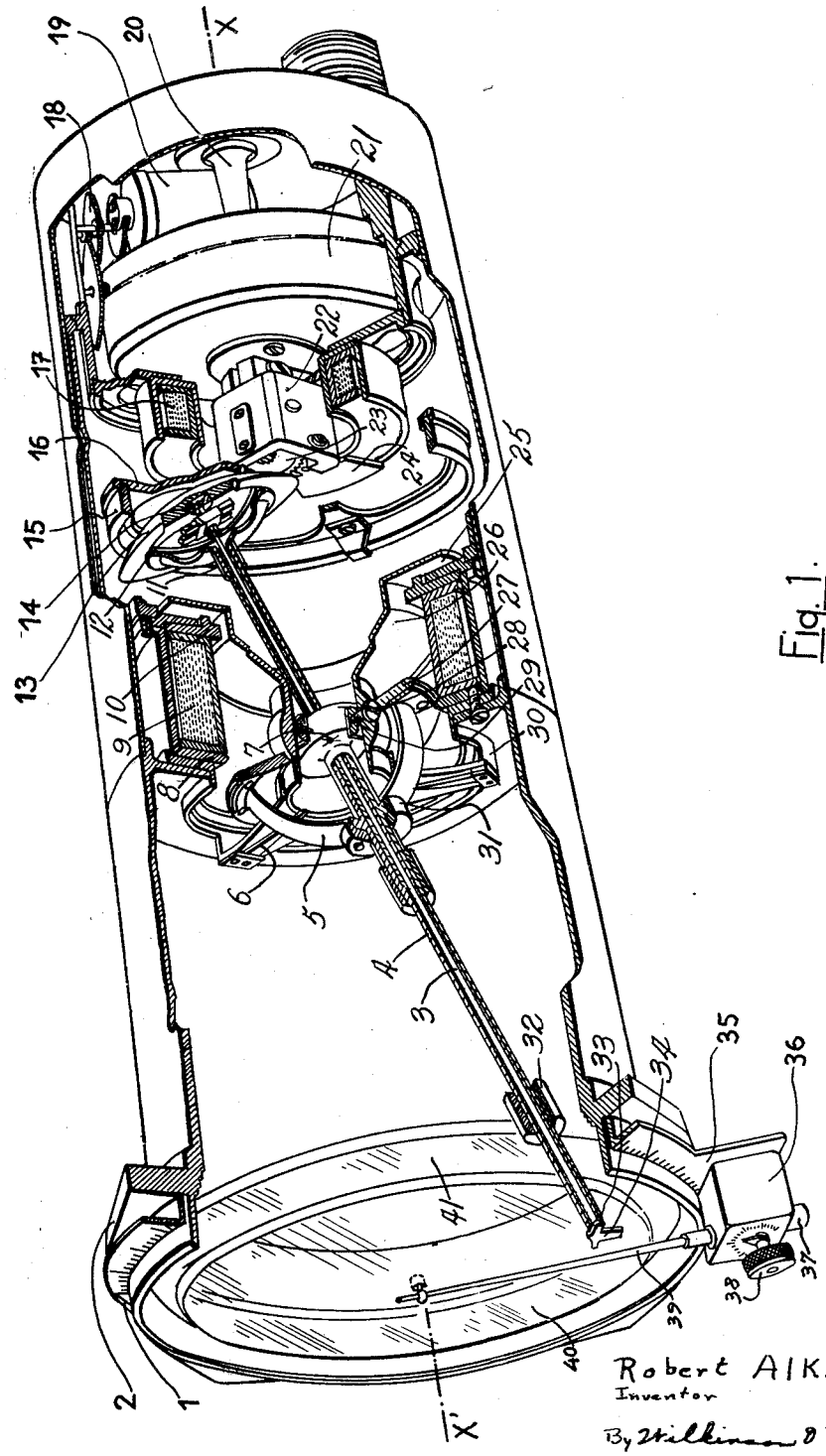
Fig. 1 is a diagrammatic perspective view, with parts in cross section and parts broken away, of one embodiment of a position-indicating instrument according to the invention.
Figure 2:
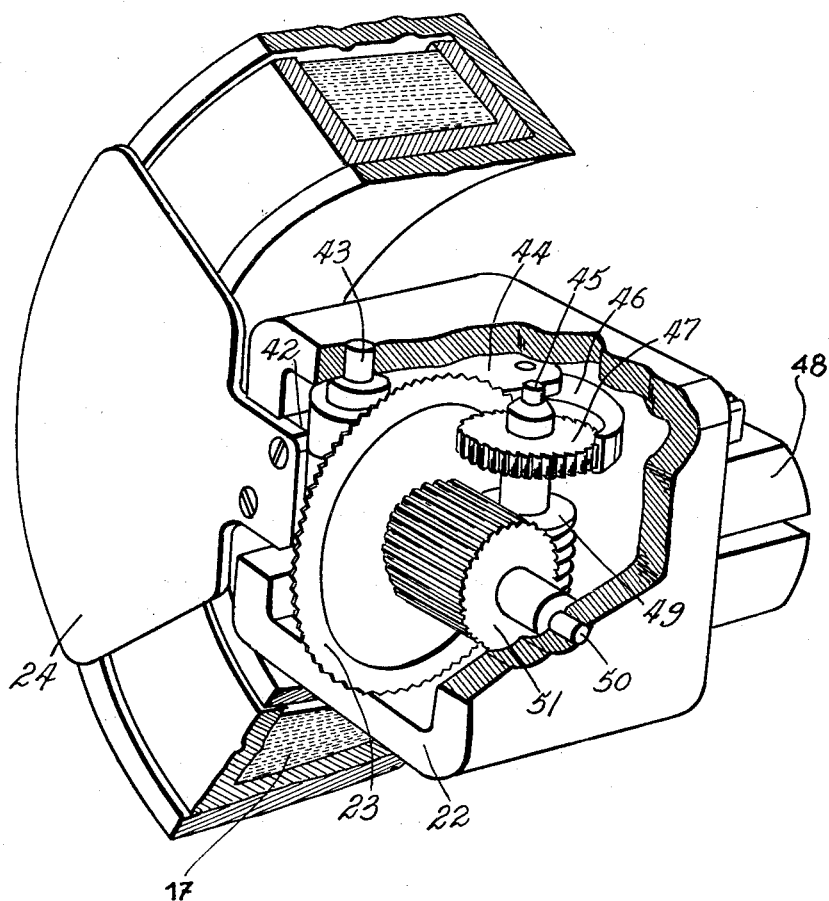
Fig. 2 is a fragmentary perspective view, on an enlarged scale of one form of the roller-drive mechanism.

As shown in the drawings, and more particularly Figs. 1 and 2, a positional indicator according to this invention may comprise a Cardan mounting consisting of two gimbal-rings 28 and 29 (Fig. 1) supported in a manner to be later explained. This Cardan mount serves to pivot universally about the point 7 a tubular arm 4 carrying at its forward end, in a manner later described, an index 34 to which the schematic contour of an aircraft is preferably imparted.

The index 34 is mounted for rotation relative to the arm 4 by means of a rod or shaft 3 having the index 34 secured on the end thereof, the rod or stem 3 extending rotatively through the tubular arm 4 and being journalled therein by means of a bearing ring 33 at the forward end of said arm. The arm 4 is so mounted that it cannot revolve about its own longitudinal axis, and is balanced by means of an adjustably positionable counterweight 32.

Arranged at the opposite, or rear, end of the arm 4, is a bushing 11 formed with a flared portion for supporting a part-spherical member 13 made of nonmagnetic material, concentrical with the pivotal centre 7 of the arm 4. The part-spherical member 13 is provided at its apex with a ball-thrust bearing 14 serving to journal the adjacent end of the internal shaft or stem 3.

The gimbal-mounting 28, 29 is supported in the instrument housing 2 in a manner now to be described. The outer gimbal ring 29 is journalled in a tubular slide-block 26 made of soft iron, having cylindrical bearing surfaces mounted for axial sliding movement in a guide supported from a bracket 30 and in a ring 10 secured to the rear of an annular electro-magnet 9 rigidly secured to the instrument housing. Upon the electro-magnet being energized, an outer peripheral flange 25 of the soft iron slider 26 becomes applied against the rear face of the electro-magnet 9, thus displacing the gimbal-mounting forward, and thereby, as later explained, disengaging the part-spherical member 13 from a drive roller 23, while the magnetic circuit of electro-magnet 9 is completed through the flared pole piece 8 and the end section of a soft iron disc 27 acting as an armature, said disc being made rigid with the arm 4 by means of spider arms 5 extending from a hub 31. With electro-magnet 9 energized, disc 27 tends to assume a position of minimum reluctance, that is, it tends to lie in the plane of the front flared polar piece 8 of magnet 9. This movement of the armature-disc about the centre of the Cardan mounting towards the axial position is a result of the couple due to the distribution of the attraction forces exerted by the magnet upon the edge portions of the disc. This movement draws the arm 4 towards its axial position XX′ and consequently restores the index 34 to the centre of the casing window 2.

Upon the electro-magnet 9 being deenergized, the tubular slider 26 is urged rearwards by the action of spring-plates such as 6 until the part-spherical member 13 has engaged the periphery of the orientable drive roller 23. The system is thus brought to its engaged condition.

The function of the angularly adjustable driver roller 23 is to produce a constant movement of the part-spherical member 13, such movement being a two-degree-of-freedom oscillatory motion about the centre 7 of the universal mounting system as a centre. This drive results from the displacement of the point of contact between the part-spherical member 13 and the periphery of the roller. The displacement, which at all times exactly follows the plane of the roller according to the well-known principle of the operation of roller integrators, results in a displacement of index 34 that is at all times proportional to the indications supplied by an airspeed-responsive device, such as a log mounted on the craft. At the same time, said displacement of the index must be angularly controlled in accordance with the indications given by a course-indicator or directional reference instrument of the craft. Both these results may be obtained according to the invention in the following way:

1. The roller 23 (Figs. 1 and 2) is mounted on a shaft 50 within an angularly adjustable casing or box 22, the shaft 50 further carrying a gear 51 meshing wth a worm 49 rigid with a ratchet wheel 47, both the worm and the ratchet being mounted on a shaft 45 journalled in box 22. The entire gearing is operated step by step by means of a pawl 46 carried by a crank arm 44 projecting from an arm 42 supported on a shaft 43 journalled in box 22. The reciprocation of the pawl is produced by the attracting force of an annular electro-magnet 17 secured to instrument housing 2, applied to an oscillating soft iron armature 24 in the form of a sector secured to the arm 42. This attraction may thus be exerted regardless of the angular orientation of the roller 23 and casing 22 supporting the roller. The electro-magnet 17 is actuated by suitable electrical signals emanating from an electric log device which thus acts to rotate the roller 23 step by step and thus advances the part-spherical member 13, thereby displacing the index 34 by amounts proportional to the distance covered by the aircraft.

The casing 22 is moreover connected through a coupling bushing 48 with the rotor of a heading signal repeater 21 which may for example be conventionally remote-controlled from a gyro-magnetic compass or the like, through a follow-up motor. This repeater is supported on a base member 20 secured to the instrument housing 2, and is operated through a gear train 18 by a follow-up motor 19 in response to the signals from a suitable transmitter.

The plane of the roller 23 is thus continually adjusted in a direction corresponding to the actual heading of the craft.

The displacements of the index 34, which are correlated with the displacements of the part-spherical member 13 will, therefore, reproduce, on a reduced scale, the flight path of the aircraft. The scale of reproduction will depend on the reducing ratio of the roller drive mechanism as well as the operating coefficient of the transmitter log device. If a transparent part-spherical dial 41 is mounted within the window of the instrument housing 2, said dial serving at the same time as a sealing cover for the housing, and said dial being provided with markings constituting geographical reference indicia at the same selected scale, then the position of the index relatively to said reference markings will provide a faithful representation of the geographical position of the craft relative to the ground, drift being of course neglected.

By modifying the operating coefficient of the log transmitter for instance by cancelling one out of every two, or two out of every three, signals, or any other suitable constant proportion of the signals, it is possible to obtain selectively any desired change in the scale of the distance indications given by the instrument.

2. Further, in accordance with the invention means are provided so that the index 34 will at all times remain oriented with respect to the geographical reference marks on the transparent part-spherical dial 41, with the same relative orientation as the course followed by the craft.

For this purpose, a ring or annulus 15 made of highly coercive alloy is secured to the orientable casing 22 by means of spider arms 16, the ring 15 being diametrically magnetized. Secured adjacent to the rear end of the shaft 3 carrying the index 34 is a magnetic system similar to that used in conventional compasses and consisting, for example, of a pair of small magnets 12. The orientation of this system and consequently that of the index 34 is defined by the orientation of the flux lines produced by the diametric magnetizing field of ring 15 and will follow all changes in craft heading, which the said ring will follow up owing to its mechanical connection with the casing 22 which carries the roller 23.

By suitably selecting the configuration of the magnetizing field used for magnetizing the ring 15, the magnetization may be so distributed around the periphery of the ring that the orientation of index 34 will faithfully follow that of the plane of the roller 23, representative of the craft heading, regardless of the position of the part-spherical member 13 within the instrument. This provides in effect a homo-kinetic connection without any material contact between the drive and driven elements.

The instrument may further be completed by introducing an air-speed or drift correction. This may for example be effected in the following way.

The geographical reference markings instead of being drawn directly upon the transparent part-spherical dial 41 secured in the window of instrument housing 2, are drawn upon an auxiliary transparent dial 40 conforming with the curvature of the part-spherical dial 41 and continually applied thereagainst by a spring-rod 39. This rod 39 is longitudinally displaced, for example, by means of a clockwork movement 36 or any other suitable motive means, at an adjustable rate, said rate being regulated in response to the wind velocity by means of a knurled knob 38 cooperating with calibrations provided on the front face of the casing of the clockwork movement 36. The movement 36 is supported on a rotatable annulus 35 provided with angular calibrations on its front face, cooperating with an index I on the instrument housing 2. By adjusting the annulus 35 in accordance with wind direction, longitudinal displacement of the rod 39 will move the surface 40 displaying the geographical indicia in response to the velocity and direction of the wind as well as of the time of travel, thus providing for airspeed or drift correction. To facilitate operation of the instrument, the clockwork movement 35 is provided with an electric zeroizing means 37 operated at the same time as the electro-magnet 9 serving to centralize the index 34 and fulfilling the further function of an automatic means for winding up the clockwork movement 36.

Figure 3:
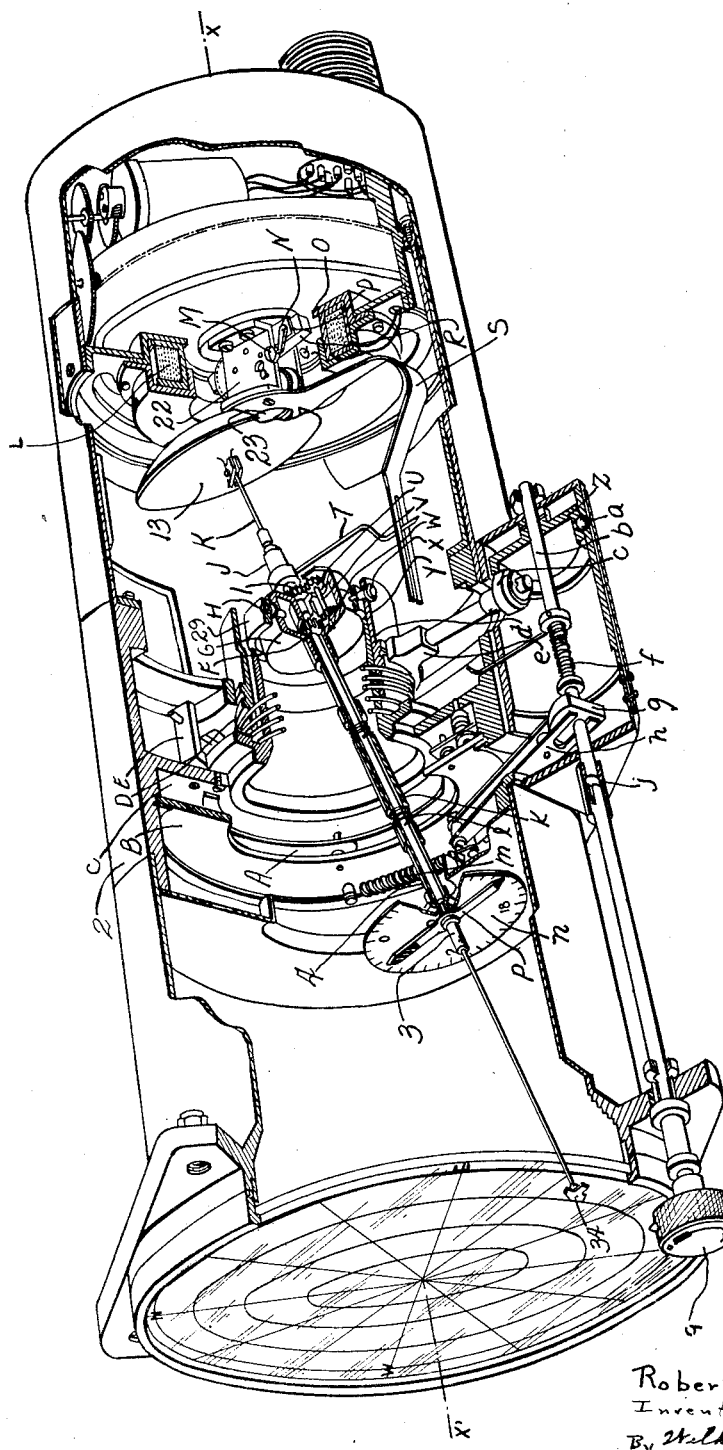
Fig. 3 is a view generally similar to that of Fig. 1 relating to another embodiment of the invention.

The embodiment illustrated in Figs. 3 and 4 will now be described.

Journalled in the outer gimbal-ring 29 of the Cardan suspension by means of two journals H is a casing G which plays the part of the inner gimbal-ring of the Cardan mounting, said casing G being connected to a non rotatable rod K serving as a support for the part-spherical member 13. Journalled on this rod is a bushing J provided with an actuating finger T engaged in the slot of an angular adjusting fork S connected with the orientable casing or box 22. The end portion of bushing J is formed as a toothed gear I which thus is journalled about the non rotatable rod K. The index-carrying shaft 3, rotatable in the tubular arm 4, is, moreover, provided with a gear F which serves to orient the index 34. The rotation of gear I is transmitted to gear F through an intermediate shaft V interconnecting a pair of gears U and W, said shaft being journalled at one end thereof in one end wall of the casing G and at its other end in a bridge member supported on the opposite end wall of said casing, the latter being formed with an aperture for permitting assembly of the shaft V and the associated gears.

Gears I and F on the one hand and U and W on the other, are respectively formed with the same number of teeth, whereby the angular adjusting movements of box 22 will be transmitted to index 34 regardless of the inclinations imparted to arm 4, as a result of the sliding displacements of finger T within the slot in fork S.

In order to facilitate the reading of the angular orientation of index 34 with greater accuracy than that normally enabled by its small dimensions (the index being necessarily small in size because of its position-indicating function), a visual course-indicator device is provided, visible through the instrument window. For this purpose, the rotary shaft 3 is provided with an additional pointer p co-operating with a dial n calibrated as a compass-dial, supported on the forward end of pivoted arm 4.

Means for disengaging the part-spherical member 13 from the drive roller 24 are provided in the form of a slider Y supporting the journals X which support the first gimbal-ring 29, and guided by a tubular bushing d connected with the frame 2. A restoring spring D urges the part-spherical member 13 against the edge surface of drive roller 24, thus retaining the assembly in its engaged condition. To disengage the system, the action of spring D is overcome to restore the slider Y forwards by manually rotating a knob q which, through a shaft b, rotates a cylindrical cam member Z provided with a peripheral camway acting on a follower roller c connected with a cradle member e mounted for rocking movement about a pivot projecting from a bracket E secured to instrument housing 2. Disengagement is produced by means of a recess formed in the cylindrical cam member Z adapted to receive therein a latching ball housed within a hole in instrument housing 2, said ball being urged outwards by a spring a.

Secured on the control shaft b supporting the aforementioned cylindrical cam Z is a further cam g operating the centralizing means for index 34. The cam members Z and g are so set with respect to each other that the cam g will exert its centralizing action only after the annular cam Z has fulfilled its releasing or disengaging action.

The index-centralizing means for restoring index 34 to its central position in this embodiment comprises an iris diaphragm consisting of three iris plates or shutters A, said iris plates being retained between a pair of annular flanges B and C integrally secured to instrument housing 2; the annular flange B being desirably provided removable to facilitate assembly.

The three iris plates A are adapted to be moved to their open position by means of a link h operated by cam g which at the same time acts to lock the iris plates in their open position. The iris plates are urged towards their closed condition by a retracting spring m. In moving towards their closed condition, the plates A act to restore the arm 4 to the centre of the apparatus and lock it in this position by engagement around a bushing k slidably mounted on said arm between a pair of springs such as l in order to allow the arm 4 to move freely in an axial direction upon engagement of the system.

The mechanism further includes a spring f threaded around the shaft b and having one of its ends anchored to the instrument housing while its other end is free. The spring f constitutes a latch preventing the shaft b from being rotated in the direction opposite from that required to perform the requisite cycle of operation.

This cycle of operation consists of two semi-revolutions, viz:

A first semi-revolution unlatches the apparatus and starts it in operation, and successively involves the following steps:

I. The part-spherical member is placed in contact engagement with the integrator roller;
II. The iris diaphragm is opened; and
III. Shaft b is latched in its operating position.

The second semi-revolution stops the operation of the apparatus and restores it to its idle condition, the index 34 being centralized to the centre of the dial. This second semi-revolution includes I. Disengaging the part-spherical member;
II. Centralizing the index by means of the iris;
III. Latching the control shaft b in idle position.

Figure 4:
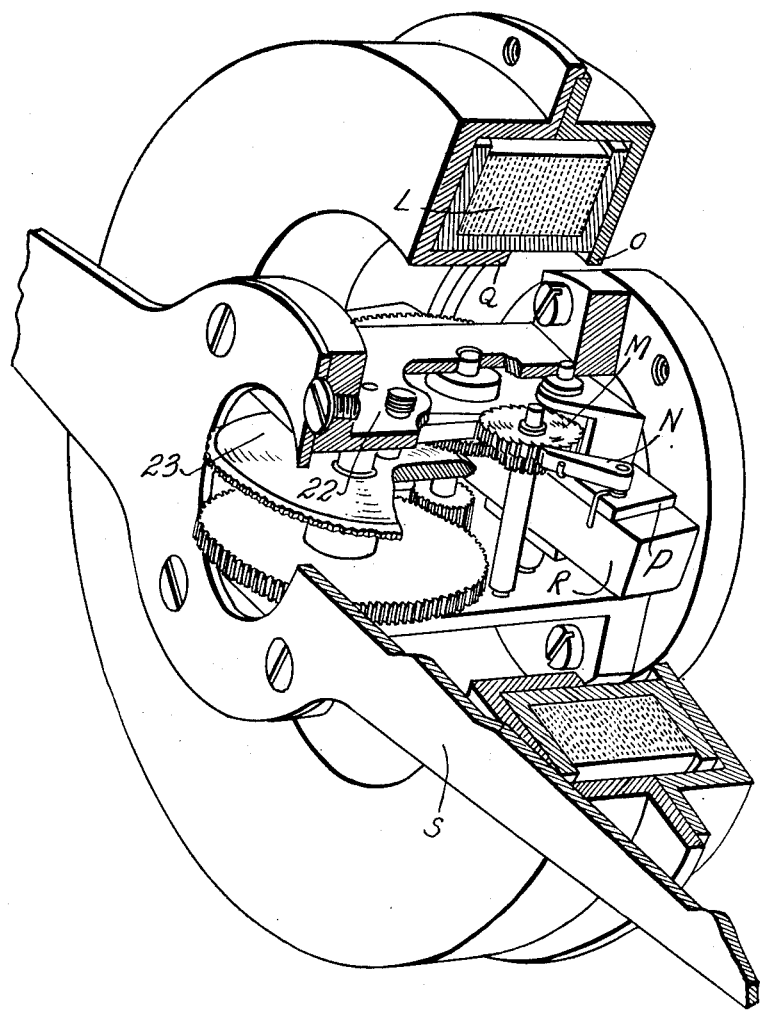
Fig. 4 is a fragmentary perspective view of another form of the roller-drive mechanism of the instrument, on an enlarged scale.

As concerns the mechanism for rotating the drive roller in response to signals from an electrically operating log, in this embodiment, as shown in Fig. 4, the driving member consists of a magnetized bar magnet R, shown as being of square form in cross section, secured in a rocking cradle member P, being for example sealed or crimped therein. The cradle member P is provided with an actuating pawl N which engages the ratchet wheel M, which in turn operates, through a gearing contained in the casing 22, the roller 23, which is angularly movable together with said casing. Surrounding the casing 22 is an annular electromagnet L having circumferential windings rigidly secured to the instrument housing 2; the airgap of magnet L is defined by pole lip portions O and Q, so as to be located at the inner cylindrical side of the magnetic body which is of toric form rectangular in cross section.

This circular airgap is so arranged that both ends of the bar magnet are adapted, during the rocking motion of cradle member P, to move to a position adjacent to the pole lips O and Q. Energization of the annular electromagnet thus makes it possible to rock bar magnet R and its associated cradle member P and thereby rotate the drive roller.

A restoring spring may be provided for the rocking cradle member if the log device used is of the type including a cut-off switch; such spring restoring means may be omitted if the log employs a reverser switch.

As a result of the above described arrangement, a low magnetizing field of the annular electro-magnet will already be sufficient in order to rock the bar magnet, and the external influence of the magnetomotive force developed by the latter is minimized owing to the screening or shielding effect provided by the magnetic body of the electro-magnet.

What I claim is:

1. Position indicating instrument for a mobile craft which comprises a housing, an arm universally pivoted about a point within said housing, an index fitted at one end of said arm so as to describe a spherical surface about said point as a centre, a part-spherical transparent dial with geographical reference markings thereon, concentrical with said point adapted to have said index move across the surface thereof, said arm projecting rearwardly beyond said pivotal point, a part-spherical member supported from the rearmost end of said arm, an angularly adjustable drive roller mounted behind said pivotal point in driving engagement with said part-spherical member, said member being movable with two degrees of freedom about said pivot point without being able to revolve about the axis of said supporting arm, means responsive to the speed of said craft relative to the surrounding medium, and means connecting said roller to said speed-responsive means for rotating said roller in proportion with the indications of said speed-responsive means by amounts such that said index will be moved across said dial proportionately to the distance covered by said craft, centralizing means for restoring said index to the centre of said dial, means for releasing said roller from engagement with said part-spherical member, means responsive to the craft heading for continually orienting the plane of said drive roller, and means for transmitting to said index the angular orientation of said drive roller.

2. Position indicator as in claim 1 wherein said means for rotating said roller in proportion with the indications of said speed-responsive means comprise a fixed annular electro-magnet, a rotatable radial armature attractive by said electro-magnet and a pawl actuated by said armature.

3. Position indicator as in claim 1 wherein said index-centralizing means comprise an iris diaphragm, spring means urging said iris to closed condition, and manually-operable cam means for opening said iris.

4. Position indicator as in claim 3 wherein the means for disengaging said roller from said part-spherical member comprise, an annular slider supporting the pivotal point of said index-carrying arm, spring means urging, through said slider, the part-spherical member toward its engaging position, a manually operable cam means for moving said slider for bringing said part-spherical member towards its disengaging position, and a control shaft supporting, together with the said cam means for opening said iris, the cam means for moving said idler, the respective cam means being so set with respect to each other that said iris cannot be closed unless said part-spherical member has been fully brought to its disengaged position through said slider.

5. Position indicator as in claim 1 which comprises a wind-velocity correcting mechanism comprising an adjustable-speed clockwork movement adjustable in speed in relation to wind velocity, adapted to radially displace the part-spherical dial provided with geographical markings thereon in accordance with the direction of the wind, the displacements of said dial being limited to translatory movements only.

6. Position indicator as in claim 5 wherein said wind-correction clockwork movement is provided with a zeroizing device adapted to operate at the same time as the index-centralizing means.

7. Position indicator as in claim 1 wherein said means for transmitting the angular displacements of said roller to said index comprise a permanent magnet secured to said means responsive to the craft heading for continually orienting the plane of said drive roller, a magnetic system within the field of said permanent magnet, and a shaft, extending through, and rotatable relative to, said pivoted arm, connecting said magnetic system to said index.

8. Position indicator as in claim 7 wherein said permanent magnet comprises a ring made of a highly coercive alloy.

9. Position indicator as in claim 1 wherein said means for transmitting the angular displacements of said roller to said index comprise a mechanical connection including a dual gear train located at the said pivotal point, said gear train comprising two co-axial pinions, a fork connected for angular displacements with the roller, a finger actuated by said fork, one of said co-axial pinions being driven by said finger, and a shaft, journalled in said pivoted arm, and driven by the other pinion of said co-axial pinions, said shaft having said index secured to the outer end thereof.

10. Position indicator as in claim 1 wherein the means for bringing the index back to the centre of the transparent part-spherical dial, which centre represents the starting point of the craft, comprise a fixed annular electromagnet, an armature belonging to the means for releasing the roller from engagement with the part-spherical member, a disc surrounding the pivotal point and connected with the pivoted arm, said electromagnet exerting an attractive force, on one side, on said armature and being provided on the other side thereof, with an annular flared pole member exerting an attractive force on said disc.

11. Position indicator as in claim 1, wherein said means for rotating said roller proportionally with the indications of said speed-responsive means comprise an annular electro-magnet consisting of a toroidal magnetic body of rectangular cross section having a circular air-gap at the inner face of the toroid, an angularly movable magnet adapted to oscillate in the field of said annular electro-magnet, and a pawl actuated by said angularly movable magnet.

12. Position indicator as in claim 1 which includes a tubular arm through which said pivoted arm rotatively extends, said tubular arm being so mounted that it cannot revolve about its longitudinal axis, a dial mounted on said tubular arm, an additional pointer mounted on said pivoted arm and adapted to move over said dial, whereby, accurate reading of the index orientation is possible.

References Cited in the file of this patent

UNITED STATES PATENTS

| Number | Name | Date |
|---|---|---|
| 1,427,267 | De Lavaud | Aug. 29, 1922 |
| 1,701,582 | Mengden | Feb. 12, 1929 |
| 1,746,420 | Fung | Feb. 11, 1930 |
| 2,567,947 | Lai | Sept. 18, 1951 |
| 2,582,374 | Dalke | Jan. 12, 1952 |

FOREIGN PATENTS

| Number | Country | Date |
|---|---|---|
| 819,835 | France | July 19, 1937 |